(12) United States Patent
Mayer et al.

(10) Patent No.: US 11,567,706 B1
(45) Date of Patent: Jan. 31, 2023

(54) PRINTING DEVICE RECONFIGURATION ACCORDING TO SETTINGS PREVIOUSLY SAVED BY SERVER DEVICE

(71) Applicant: Hewlett-Packard Development Company, L.P., Spring, TX (US)

(72) Inventors: Brian C. Mayer, Boise, ID (US); Paul L. Jeran, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/462,535

(22) Filed: Aug. 31, 2021

(51) Int. Cl.
*G06F 3/12* (2006.01)

(52) U.S. Cl.
CPC .......... *G06F 3/1204* (2013.01); *G06F 3/1226* (2013.01); *G06F 3/1286* (2013.01)

(58) Field of Classification Search
CPC ..... G06F 3/1204; G06F 3/1226; G06F 3/1286
USPC ...................................................... 358/1.15
See application file for complete search history.

(56) References Cited

U.S. PATENT DOCUMENTS

| | | | |
|---|---|---|---|
| 7,202,962 B2* | 4/2007 | Roosen ................. | G06F 3/1291 358/1.15 |
| 10,970,006 B1* | 4/2021 | Nazzaro ................ | G06F 3/1267 |
| 2019/0238707 A1* | 8/2019 | Tsuda ................. | H04N 1/00326 |
| 2019/0361632 A1* | 11/2019 | Hosoda ................ | G06F 3/1231 |
| 2022/0283761 A1* | 9/2022 | Shrestha .............. | G06F 3/1292 |

* cited by examiner

*Primary Examiner* — Allen H Nguyen
(74) *Attorney, Agent, or Firm* — Brooks, Cameron & Huebsch, PLLC

(57) ABSTRACT

A server device receives a request over a network for settings for a printing device having an identifier. The server device determines whether the settings for the printing device were previously received from the printing device and responsively saved by the server device, based on the identifier of the printing device. In response to determining that the settings for the printing device were previously received from the printing device and responsively saved by the server device, the server device transmits the settings over the network to reconfigure the printing device according to the settings.

14 Claims, 8 Drawing Sheets

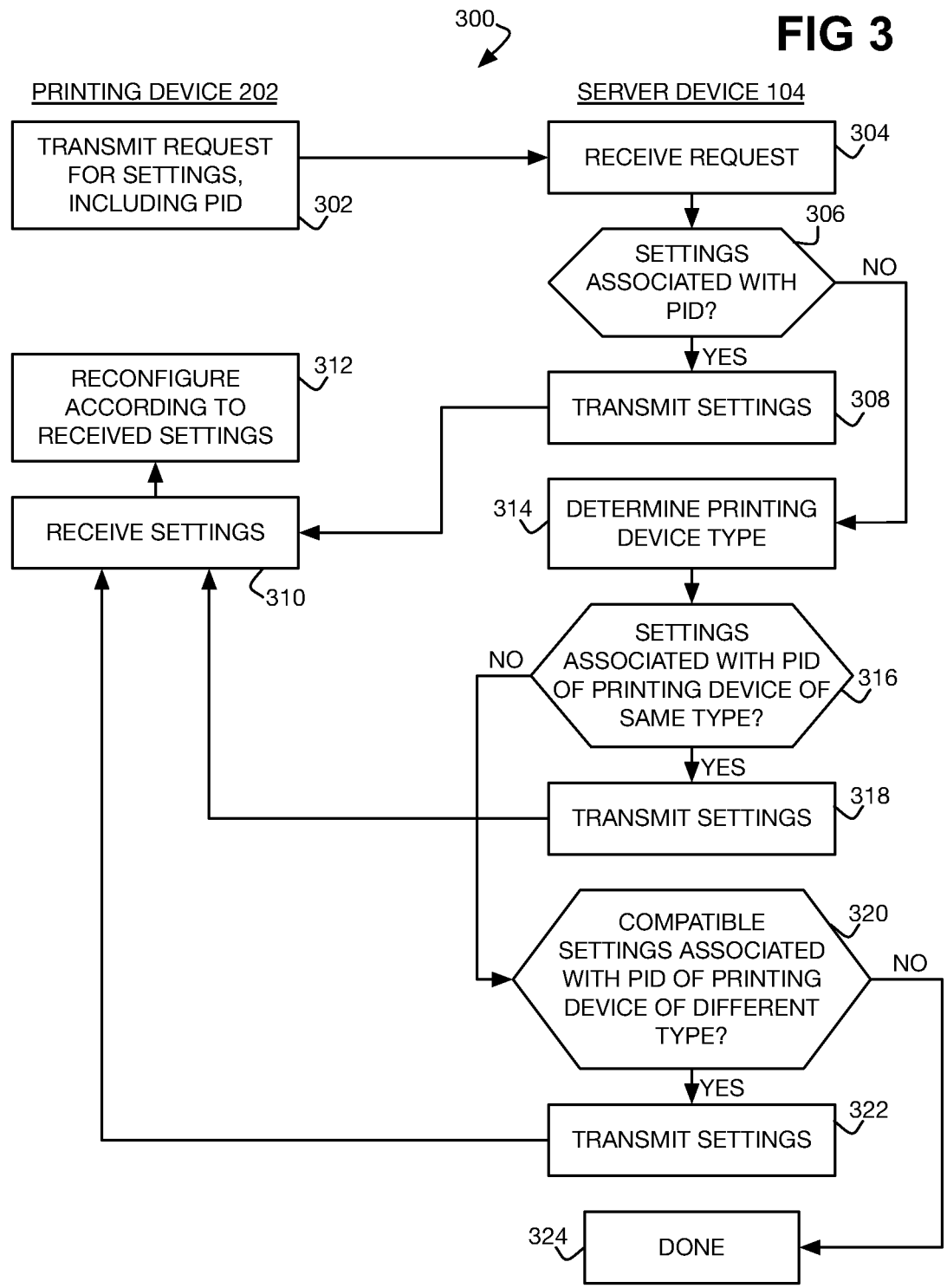

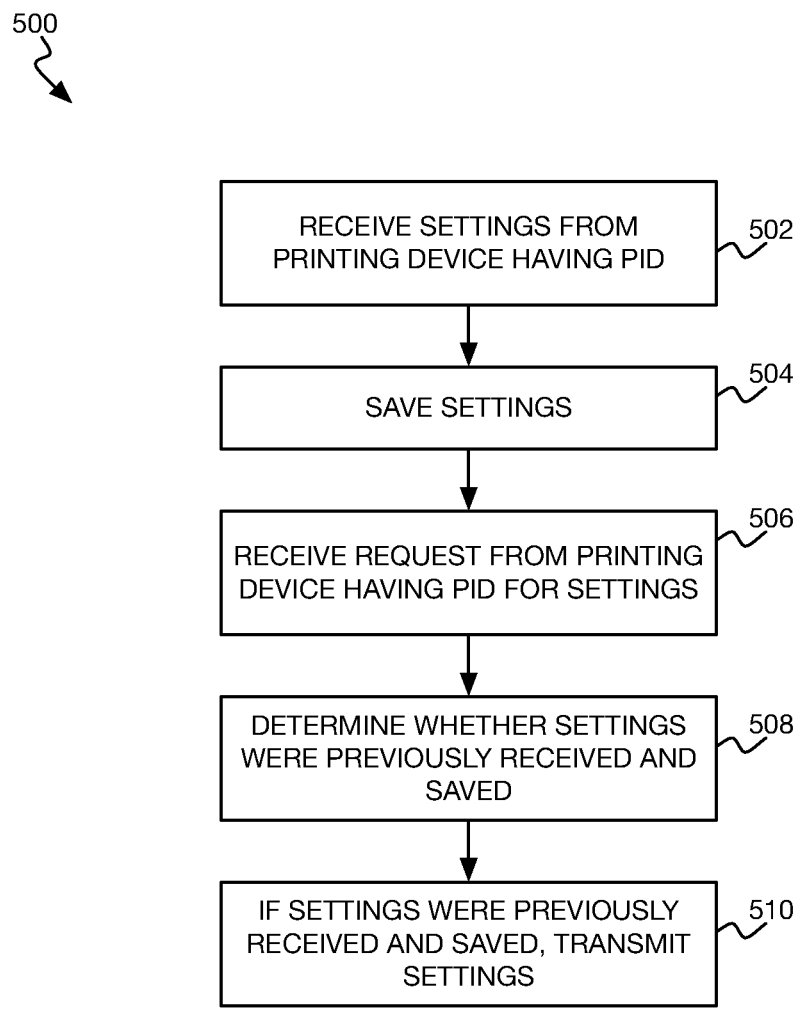

PRINTING DEVICE RECONFIGURATION ACCORDING TO SETTINGS PREVIOUSLY SAVED BY SERVER DEVICE

BACKGROUND

Printing devices include standalone printers as well as all-in-one (AIO) devices and multifunction devices (MFDs) that in addition to printing capability having other capabilities such as scanning, copying, and/or faxing capability. Printing devices can use a variety of different technologies to form images on media such as paper, as well as to from three-dimensional (3D) objects in the case of 3D printing devices. Such technologies include different types of laser and light-emitting diode (LED) printing technologies, as well as inkjet-printing technologies and 3D printing technologies. Printing devices deposit print material, such as colorant like toner and ink (which can include other printing fluids or material as well), among other types of print material.

BRIEF DESCRIPTION OF THE DRAWINGS

FIG. 3 is a flowchart of an example method for reconfiguring a printing device with settings previously saved at a server device, in which the printing device requests the previously saved settings.

FIG. 5 is a flowchart of an example method.

DETAILED DESCRIPTION

Figure 1A:
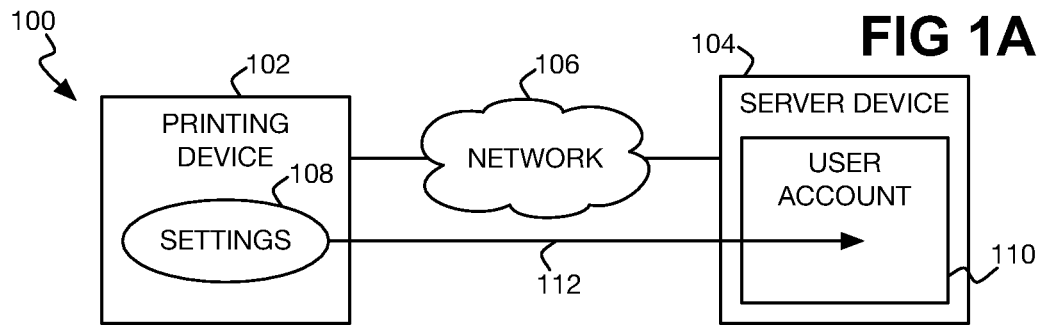
FIG. 1A is a diagram of an example scenario in which a printing device transmits its settings to a server device for saving at the server device.

As noted in the background, printing devices output print material, such as toner, ink, and other types of print material, to form images on media such as paper in the case of two-dimensional (2D) printing devices and to form three-dimensional (3D) objects in the case of 3D printing devices. A printing device receives a print job, and then prints to complete the print job. A printing device can have a variety of configurable settings that govern how the device completes received print jobs.

The settings that can be configured can be quite numerous and can involve painstaking manual configuration before a user is satisfied with the printing that occurs as a result of the settings. Some settings may be exposed within a device driver for the printing device installed at a host computing device, such as a desktop, laptop, or notebook computer, to which the printing device is communicatively connected. The same or different settings may be configurable through an app installed on a user device, such as a smartphone, with which the printing device is in communicative connection. More advanced and granular settings may be configurable through an internal web page of the printing device that can be accessed via a web browser on a device communicatively connected to the printing device.

Examples of basic settings can include whether a printing device is to print in color or in black-and-white and whether the device is to print in simplex or duplex. A printing device that has various finishing options, including stapling, three-hole punching, and so on, may have settings governing these options. A printing device may have toner- or ink-saver settings that reduce the amount of toner, ink, or other colorant used to form images. At a more granular level, a printing device may have settings governing the density at which colorant should be output. A color printing device can have settings specifying the color tables in accordance with which color images are converted to the device's color space for more accurate color reproduction.

Once a user has configured a printing device's settings, there may not be a way to easily save the settings for later retrieval. If a printing device is purposefully or accidentally reset to its factory defaults, for instance, the user has to again specify the device's settings manually. A user may send a printing device for repair or service, and as part of the repair or service process the device may be reset to its factory defaults. Therefore, when the printing device is returned to the user, the user may again have to manually specify the device's settings in some situations. If the printing device is unable to be repaired and an identical replacement device is instead provided to the user, the user similarly has to configure the new device's settings. A user may upgrade a printing device with a new printing device of a different type that nevertheless has settings at least partially compatible with the original device's settings, but the user still has to reconfigure the new device's settings.

Techniques described herein provide for saving a printing device's settings at a server device to which the printing device is communicatively connected. The same or different printing device can therefore automatically retrieve the previously saved settings from the server device for reconfiguration. As such, a user does not have to painstakingly manually specify the settings again. A printing device may automatically transmit its settings to the server device for saving periodically or any time the settings change. At reset to default settings or at initial setup of a printing device, the printing device may automatically retrieve previously saved settings for the same or different printer from the server device for reconfiguration.

FIGS. 1A, 1B, 1C, and 1D show different example scenarios 100, 120, 140, and 180 as to usage of a server device 104 to save printing device settings for later retrieval. In FIG. 1A, a printing device 102 is communicatively connected to the server device 104 over a network 106. Settings 108 for the printing device 102, once configured, are transmitted to the server device 104 over the network 106, per arrow 112. The server device 104 saves the settings 108 for the printing device 102 within a user account 110 with which the printing device 102 is associated. The user account 110 can be for a specific user that has (e.g., owns or operates) the printing device 102.

Figure 1B:
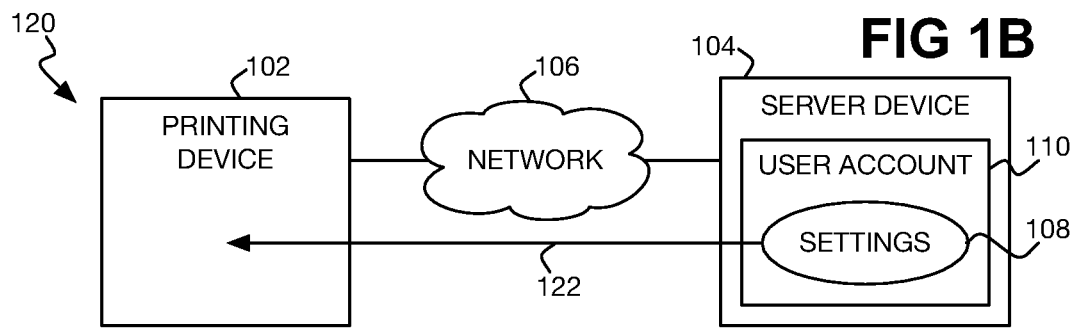
FIGS. 1B, 1C, and 1D are diagrams of different example scenarios in which a printing device retrieves previously saved settings from a server device for reconfiguration.

In FIG. 1B, the same printing device 102 may have been reset, such the printing device 102 may have reverted to its default settings. As noted, the user may him or herself have purposefully or accidentally reset the printing device 102. In another example, the printing device 102 may have required service or maintenance that resulted in the device 102 having been reset prior to its return to the user. The printing device 102 can automatically or otherwise retrieve the previously saved settings 108 at the user account 110 from the server device 104 over the network 106 for reconfiguration, per arrow 122, at (e.g., after) reset. The retrieval and reconfiguration process may be performed in the background, such that the user is unaware, or the user may be made aware of the process and can be requested to confirm that the process is to occur.

Figure 1C:
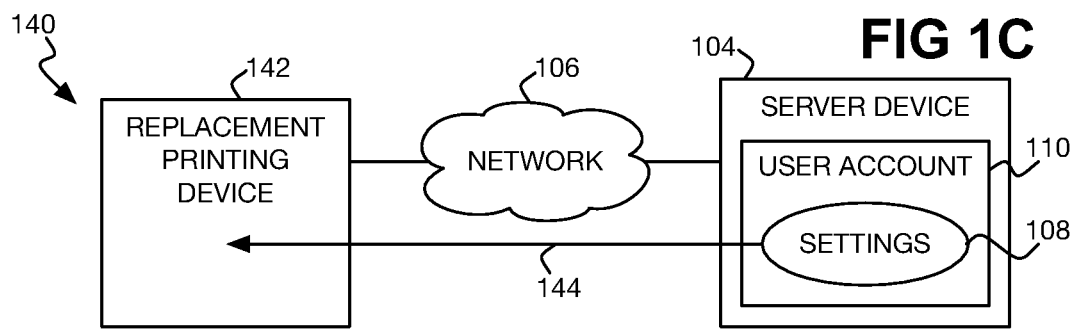

In FIG. 1C, the printing device 102 may have been replaced with a replacement printing device 142 of the same type. That is, the replacement printing device 142 can be identical to the printing device 102 in that both are the same printing device model, but differ in serial number or other printing device identifier. The replacement printing device 142 is associated with the same user account 110 at the server device 104 with which the original printing device 102 is associated. The replacement device 142 can automatically or otherwise retrieve the previously saved settings 108 for the printing device 102 from the server device 104 over the network 106 for reconfiguration, per arrow 144, at initial setup. As before, retrieval and reconfiguration may be performed in the background without the user being aware, or the user may be made aware of the process and can be requested to confirm that retrieval and reconfiguration is to occur.

Figure 1D:
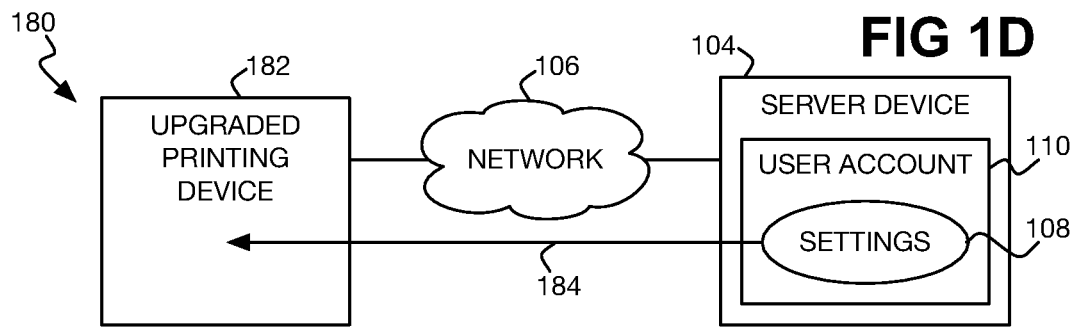

In FIG. 1D, the printing device 102 has been upgraded with an upgraded printing device 182. That is, the printing device 102 has been replaced with a printing device 182 of a different type, such as a different printing device model. However, the printing device 182 is compatible with the previously saved settings 108 for the printing device 102 at least partially (i.e., even though the printing devices 102 and 182 are of different types). For example, the printing device 182 may be a model within the same family of models as the printing device 102, but have additional functionality and faster throughput. In this case, the printing device 182 may be completely compatible with the settings 108, since the settings 108 form a subset of the available configurable settings of the device 182.

In other cases, some of the settings 108 may not be relevant to the printing device 182. For example, the printing device 182 may not be a color printing device whereas the printing device 102 was, in which case those settings 108 that pertain to color printing are irrelevant to the printing device 182. In any case, the upgraded printing device 182 can automatically or otherwise retrieve the previously saved settings 108 for the printing device 102 from the server device 104 over the network 106 for reconfiguration, per arrow 184, at initial setup. The printing device 182 is associated with the same user account 110 as the printing device 102. As before, retrieval and reconfiguration may be performed in the background without the user being aware, or the user may be made aware of the process and can be requested to confirm that retrieval and reconfiguration is to occur.

In one implementation, a user may be requested to reconfigure settings that have not been previously retrieved or that are no longer valid. For example, if the original printing device 102 is a black-and-white printing device and the upgraded printing device 182 is a color printing device, then the settings 108 for the printing device 102 would not include settings pertaining to color printing. Therefore, the user would be requested to provide such settings for the upgraded printing device 182. As another example, if the settings 108 pertain to a wireless network that is no longer present, then the user can be requested to reconfigure these settings 108. For instance, the settings 108 for a wireless network may include network credentials, including network name and password. If a wireless network having that name is no longer present, or if the password has changed and is no longer valid, then the user can be requested to provide these settings 108 again.

Figure 2:
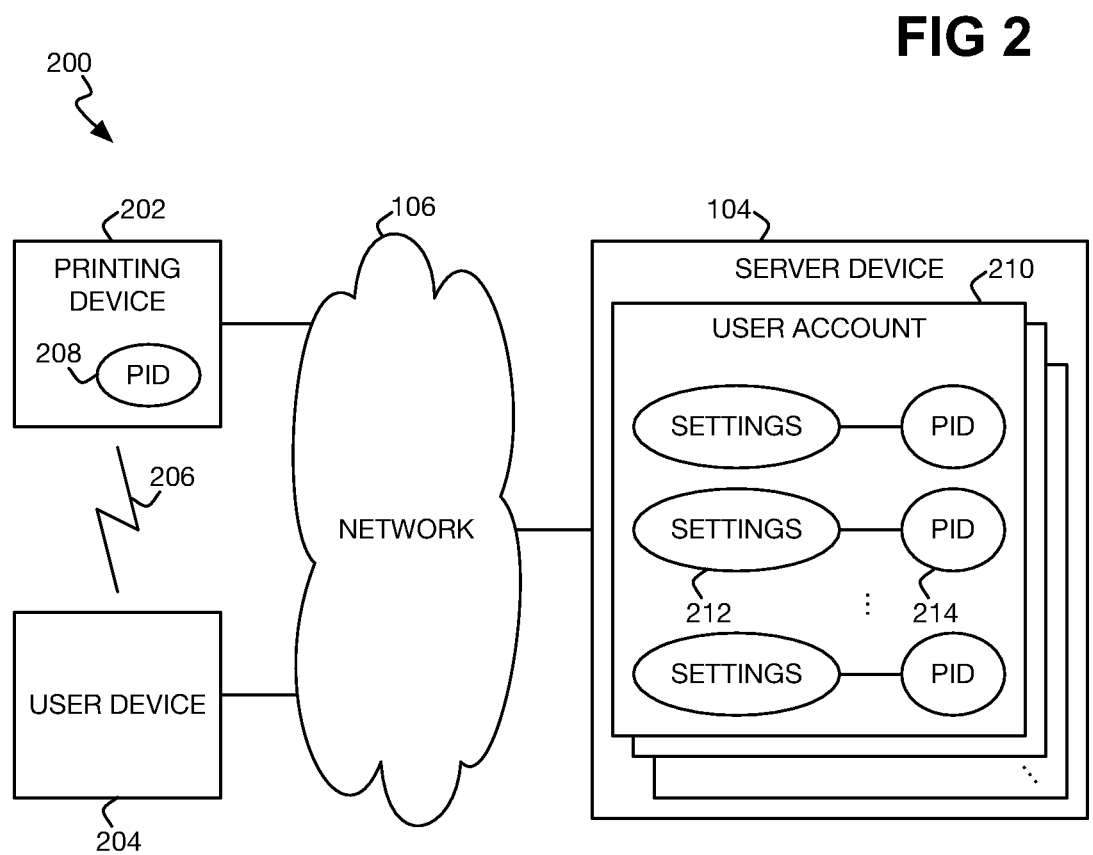
FIG. 2 is a diagram of an example system in which a printing device can be reconfigured using settings previously saved at a server device.

FIG. 2 shows an example system 200. The system 200 includes the server device 104 and a printing device 202, and can also include a user device 204. The server device 104 may be a server computing device that is operated by or on behalf of the manufacturer of the printing device 202 to provide a cloud service to the printing device 202. The server device 104 is communicatively connected to the network 106. The network 106 may be or include the Internet, an intranet, an extranet, a wide-area network, a local-area network, a wireless network, a wired network, a mobile communications network, and so on.

The printing device 202 may be a standalone printer or an all-in-one (AIO) printing device. The printing device 202 can also be communicatively connected to the server device 104 over the network 106. The printing device 202 has a printing device identifier (PID) 208 that uniquely identifies the printing device 202. The PID 208 may be the serial number of the printing device 202, a network address of the printing device 202 such as a media-access control (MAC) address, or another type of unique identifier.

The user device 204, when present, can be a computing device such as a desktop, laptop, or notebook computer, a smartphone, a tablet computing device, or another type of computing device. The user device 204 is communicatively connected to the server device 104 over the same or different network 106 as that over which the printing device 202 is communicatively connected to the server device 104 if the printing device 202 is so connected to the server device 104. The user device 204 can establish a communicative connection 206 with the printing device 202.

For example, the user device 204 and the printing device 202 may be communicatively connected directly, such as via near-field communication (NFC), Bluetooth, Wi-Fi Direct, or in another manner that may not rely on a separate centralized (e.g., non-peer-to-peer) network like the network 106. In the case of Bluetooth or Wi-Fi Direct, for instance, a peer-to-peer network may be temporarily created by the printing device 202 for direct communication between the printing device 202 and the user device 204. However, the communicative connection 206 may instead be a centralized network and can indeed be the network 106.

The server device 104 maintains a number of user accounts 210. Each user account 210 includes one or multiple previously saved sets 212 of settings for the same or different printing devices. Each settings set 212 is associated with a PID 214 of the printing device that transmitted the set 212 of settings to the server device 104 for saving at the user account 210 with which the printing device is associated. A user having multiple printing devices (either at the same time, or over time) therefore will have settings sets 212 for printing devices having respective different PIDs 214. For each printing device, there may be one set 212 of settings saved at the user account 210 by the server device 104, or there may be multiple such sets 212. In the former case, the saved settings are the most recent (i.e., current) settings for the printing device in question, whereas in the latter case, a number of the most recent sets 212 may be saved.

If the printing device 202 is communicatively connected to the server device 104 over the network 106, the server device 104 is able to identify the user account 210 with which the printing device 202 is associated via the printing device 202 providing the server device 104 with its PID 208. The printing device 202 may be initially associated with a user account 210 when a user has purchased or is assigned the printing device 202, such that at that time the PID 208 of the printing device 202 is associated with the user account 210. The printing device 202 may be later associated with a user account 210 via a user logging into his or her user account 210 at the server device 104, and providing the PID 208 of the printing device 202.

The user device 204 can also be associated with a user account 210 in that a user may log onto his or her user account 210 at the server device 104 using or via the user device 204. For example, an app running on the user device 204 may query the user for a username and password, or other credentials, by which to authenticate the user with an associated user account 210 at the server device 104. As such, the server device 104 is able to identify the user account 210 with which the user device 204 is associated in this manner.

FIG. 3 shows an example method 300 for configuring the printing device 202 with settings previously transmitted to and saved by the server device 104, in an implementation in which the printing device 202 directly requests the previously saved settings. The left parts of the method 300 are performed by the printing device 202 and the right parts are performed by the server device 104. The method 300 may be implemented as program code stored on a non-transitory computer-readable data storage medium and executed by a processor of a respective device. For example, a processor of the printing device 202 can execute program code to perform the left parts of the method 300, and a processor of the server device 104 can execute program code to perform the right parts.

The printing device 202 transmits a request for settings for the printing device 202 over the network 106 to the server device 104 (302), which responsively receives the request from the printing device 202 over the network 106 (304). The request may be automatically transmitted at first (i.e., initial) setup of the printing device 202, or after reset of the device 202 to default settings. The request may be automatically transmitted without notification to the user, such that the user is unaware, or the user may be made aware of the request and can be requested to provide confirmation that the request for settings should be made.

The request includes the PID 208 of the printing device 202. The server device 104 determines whether the settings for the printing device 202 were previously transmitted by the printing device 202 and previously saved by the server device 104, based on the PID 208 of the printing device 202 (306). That is, the server device 104 determines whether there is a set 212 of settings associated with the printing device 202, such as a set 212 of settings associated with the PID 208 of the printing device 202 at the user account 210 with which the printing device 202 is associated.

If there is a set 212 of settings associated with the PID 208 of the printing device 202, then the server device 104 transmits the settings set 212 over the network 106 in reply to the printing device 202 (308), which responsively receives the set 212 from the server device 104 over the network 106 (310). If the server device 104 has multiple sets 212 of settings for the printing device 202 at the user account 210 associated with the printing device 202, the server device 104 may automatically select the most recent settings set 212 to transmit. The server device 104 may instead query the user of the printing device 202 as to which set 212 of settings should be transmitted, an example implementation of which is described later in the detailed description.

In the example of FIG. 3, however, if there is not a set 212 of settings associated with the PID 208 of the printing device 202, then the server device 104 determines the printing device type of the printing device 202 (314). The printing device type can be the model of the printing device 202. Such information may be able to be looked up using the PID 208 of the printing device 202, for example. The server device 104 then determines whether there is a set 212 of settings associated with the PID 214 of a (first) different printing device of the same printing device type as the printing device 202 (316). The printing device type for each printing device having a set 212 of settings stored at the user account 210 with which the printing device 202 is associated may be looked up using its PID 214, for instance, and compared to the printing device type of the printing device 202 to identify a match.

If there is a set 212 of settings associated with the PID 214 of a printing device of the same type as the printing device 202, then the server device 104 transmits the settings set 212 over the network 106 to the printing device 202 (318), which responsively receives the set 212 from the server device 104 over the network 106 (310). If the server device 104 has multiple sets 212 of settings for a printing device of the same type as the printing device 202, or if the server device 104 has one or multiple sets 212 of settings for more than one printing device of the same type as the printing device 102, the server device 104 may automatically select the most recently saved set 212 to transmit. The server device 104 may instead query the user of the printing device 202 as to which set 212 to transmit, where the available such settings sets 212 may include those associated with the PID 208 of the printing device 202, if any. An example implementation in this respect is described later in the detailed description.

In the example of FIG. 3, however, if there is not a set 212 of settings associated with the PID 214 of a printing device of the same type as the printing device 202, then the server device 104 determines whether there is any compatible set 212 of settings associated with a PID 214 of a (second) different printing device of a different type than the printing device 202 (320). For example, sets 212 of settings for different types of printing devices may be mapped to the configurable settings of the printing device 202. If any setting within a set 212 is mapped to a corresponding setting of the printing device 202, then the printing device 202 may be considered as compatible with the set 212 in question. As another example, printing devices of different models but within the same family of models may be considered as having compatible settings, in which at least some if not all settings are common across the different models.

If there is a set 212 of settings associated with the PID 214 of a printing device of a different type as the printing device 202, but with which the printing device 202 is compatible, then the server device 104 transmits the settings set 212 over the network 106 to the printing device 202 (322), which responsively receives the set 212 from the server device 104 over the network 106 (310). If the server device 104 has multiple sets 212 of compatible settings for a printing device of a different type than the printing device 202, or if the server device 104 has one or multiple sets 212 of compatible settings for more than one printing device of different types than the printing device 102, the server device 104 may automatically select the most recently saved set 212 or the set 212 having the greatest number of compatible settings to transmit.

The server device 104 may instead query the user of the printing device 202 as to which set 212 to transmit, where the available such settings may include those associated with PIDs 214 of printing devices of the same type as the printing device 202, if any, and/or those associated with the PID 208 of the printing device 202, if any. An example implementation in this respect is described later in the detailed description. However, in the example of FIG. 3, if there is not a set 212 of compatible settings associated with the PID 214 of a printing device of a different type than the printing device 202, then the method 300 is finished (324) without transmitting any set 212 of settings to the printing device 202, since no such set 212 in accordance with which the printing device 202 can be reconfigured is available.

Assuming that the printing device 202 does receive a set 212 of settings from the server device 104, though, then the printing device 202 is reconfigured (i.e., the device 202 reconfigures itself) according to the received settings (312). That is, the configurable settings of the printing device 202 are set to values of the settings of the received set 212. Such reconfiguration of the printing device 202 may be transparent to the user of the printing device, in that the user may not be aware that reconfiguration has occurred. That is, after reset or at initial setup of the printing device 202, the device 202 may automatically retrieve a settings set 212 from the printing device 104 and perform reconfiguration without notifying the user. From the perspective of the user, he or she can begin using the printing device 202 once reconfiguration is complete, without having to manually and painstakingly configure the device 202.

The method 300 assumes that the printing device 202 has network connectivity to the network 106 so that the device 202 can communicate with the server device 104 over the network 106. In the case of a wired network connection, network connectivity can be automatic, and not involve interaction on the part of the user. However, in the case of a wireless network connection, the user may first have to set up such wireless network connectivity before the printing device 202 can be automatically reconfigured in accordance with the method 300. The user may manually enter wireless network credentials (e.g., a network name and a password) at the printing device 202 itself, or provide the credentials to the printing device 202 via the user device 204.

Figure 4A:
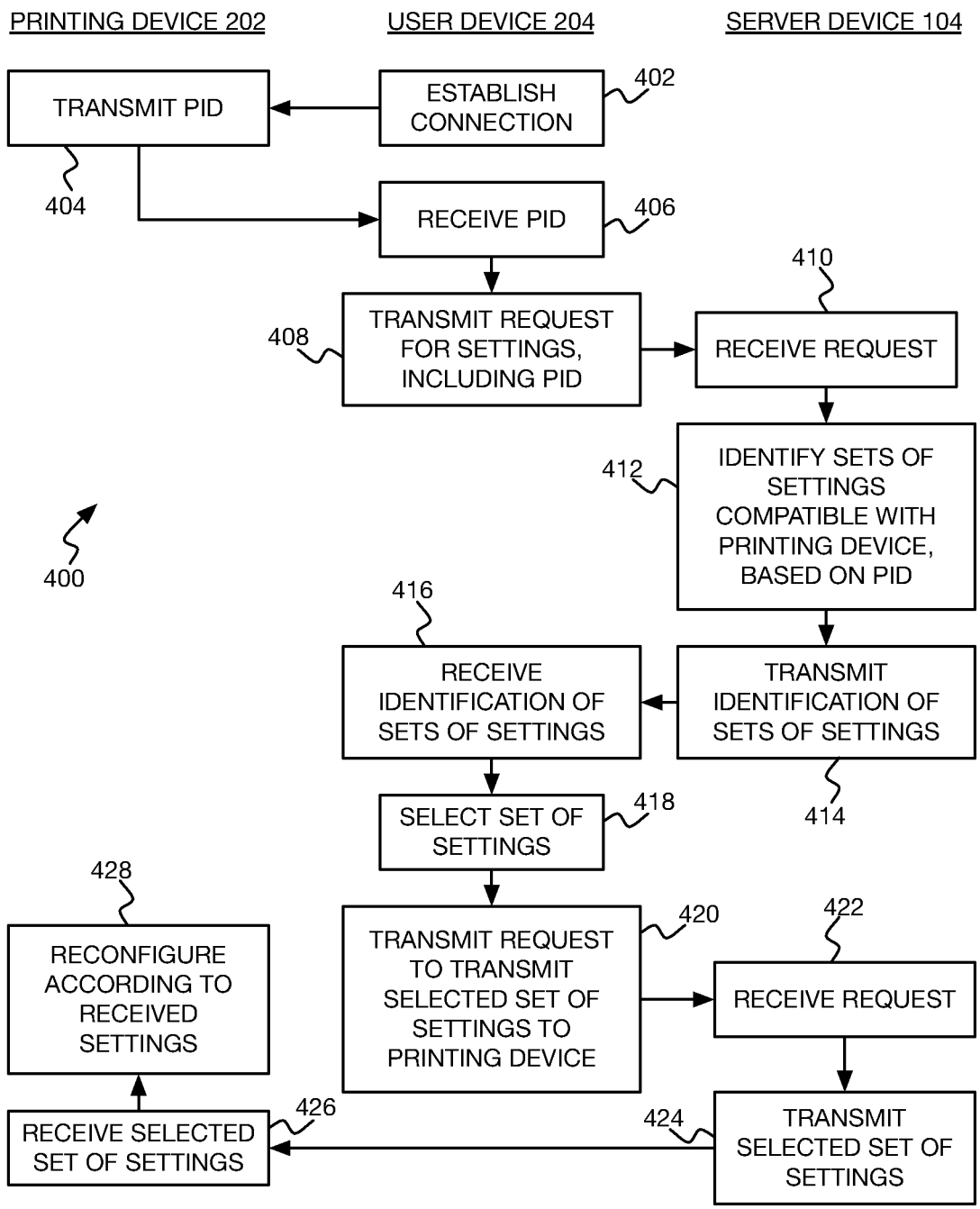
FIGS. 4A and 4B are flowcharts of different example methods for reconfiguring a printing device with settings previously saved at a server device, in which a user device in communicative connection with the printing device requests the previously saved settings.

FIG. 4A shows an example method 400 for configuring the printing device 202 with settings previously transmitted to and saved by the server device 104, in an implementation in which the user device 204 requests the previously saved settings. The left parts of the method 400 are performed by the printing device 202, the middle parts are performed by the user device 204, and the right parts are performed by the server device 104. Like the method 300, the method 400 may be implemented as program code stored on a non-transitory computer-readable data storage medium and executed by a processor of a respective device. As one example, a processor of the user device 204 can execute program code to perform the middle parts of the method 400.

The user device 204 establishes a communicative connection 206 with the printing device 202 (402). As noted, the communicative connection 206 may be a peer-to-peer connection over a non-centralized network, such as a Bluetooth or Wi-Fi Direct connection, or the connection 206 may be over the network 106 itself if the printing device 202 is connected to the network 106 in addition to the user device 204 being connected to the network 106. The printing device 202 transmits its PID 208 over the established connection 206 to the user device 204 (404), which responsively receives the PID 208 over the connection 206 (406).

The user device 204 transmits a request for settings for the printing device 202 over the network 106 to the server device 104 (408), which responsively receives the request from the user device 204 over the network 106 (410). The request may be automatically transmitted at first (i.e., initial) setup of the printing device 202, or after reset of the device 202 to default settings. The request includes the PID 208 of the printing device 202.

The server device 104 identifies sets 212 of settings with which the printing device 202 is compatible, based on the PID 208 of the printing device 202 (412). The sets 212 may be those that the server device 104 previously saved at the user account 210 with which the user device 204 and the printing device 202 are both associated. This is the user account 210 that the user may have logged onto at the server device 104 via the user device 204 before the request was transmitted in part 408. The identified sets 212 of settings can include one or multiple sets 212 of settings that the printing device 202 itself had transmitted to the server device 104, and thus which the server device 104 previously saved and associated with the PID 208 of the printing device 202. These sets 212 are the sets 212 described in relation to part 306 of the method 300.

The identified sets 212 of settings can include one or multiple sets 212 that one or multiple (first) different printing devices of the same type as the printing device 202 had transmitted to the server device 104, and thus which the server device 104 previously saved and associated with the PIDs of such different printing devices. These sets 212 are the sets 212 described in relation to part 316 of the method 300. Finally, the identified settings sets 212 can include one or multiple sets 212 of compatible settings that one or multiple (second) different printing devices that are not of the same type as the printing device 202 had transmitted to the server device 104, and thus which the server device 104 previously saved and associated with the PIDs 214 of such different printing devices. These sets 212 are the sets 212 described in relation to part 320 of the method 300.

The server device 104 transmits identification of the sets 212 of settings that have been identified over the network 106 to the user device 204 (414), which responsively receives identification of the settings sets 212 over the network 106 (416). The settings sets 212 are not themselves transmitted to the user device 204, however. For instance, each set 212 of settings may be identified by the PID 214 of its associated printing device, as well as other information such as the model or other type of the printing device and any previously user-specified name of the printing device. Each set 212 may further be identified by the date at which the server device 104 saved the settings, particularly in the case in which there are more than one set 212 of settings for a given PID 214 (i.e., for a given printing device).

The user device 204 selects a set 212 of settings from the identified settings sets 212 (418), as the selected set 212 in accordance with which the printing device 202 is to be reconfigured. For example, the user device 204 may display the identification of each set 212 by PID 214 and by printing device model or other type and printing device name if available, as well by the date at which the server device 104 saved the settings. If there are multiple sets 212 associated with a given PID 214, each set 212 may be displayed in this manner. In another implementation, an indication that there are multiple sets 212 associated with a given PID 214 may be displayed, and the user given an opportunity to view them as desired. The user then selects the set 212 of settings of interest for reconfiguring the printing device 202.

In the example of FIG. 4A, the user device 204 transmits a request over the network 106 to the server device 104 to transmit the selected settings set 212 directly to the printing device 202 for reconfiguration (420). The server device 104 thus responsively receives the request from the user device 204 over the network 106 (422). The server device 104 in turn transmits the selected set 212 of settings over the network 106 to the printing device 202 (424), which responsively receives the selected set 212 over the network 106 from the server device 104 (426). The printing device 202 is then reconfigured (i.e., the device 202 reconfigures itself) according to the received settings (428), as in part 318 of the method 300.

The method 400, like the method 300, assumes that the printing device 202 has network connectivity to the network 106 so that the device 202 can communicate with the server device 104 over the network 106 to receive the selected settings set 212. As noted, in the case of a wired network connection, such wired connectivity can be automatic, and not involve interaction with the user of the user device 204. In the case of a wireless network connection, however, such wireless connectivity can be established using the communicative connection 206 between the user device 204 and the printing device 202 established in part 402. The user may manually enter the wireless network credentials at the user device 204 for transmission to the printing device 202, or the wireless network credentials that the user device 204 uses to connect to the network 106 may be automatically transmitted to the printing device 202 to connect to the network 106.

Figure 4B:
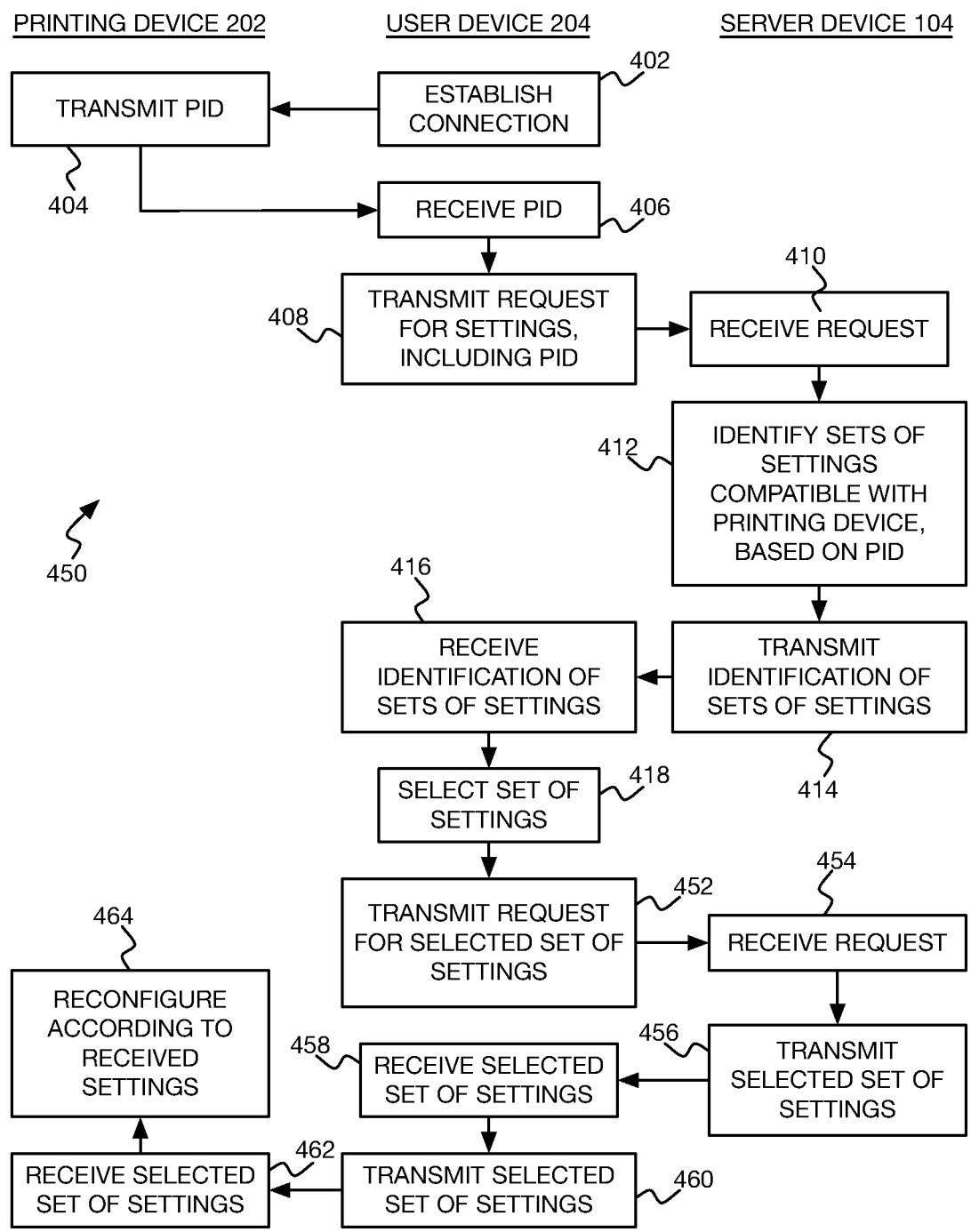

FIG. 4B shows another example method 450 for configuring the printing device 202 with settings previously transmitted to and saved by the server device 104, in an implementation in which the user device 204 requests the previously saved settings. The left parts of the method 450 are performed by the printing device 202, the middle parts are performed by the user device 204, and the right parts are performed by the server device 104. Like the methods 300 and 400, the method 450 may be implemented as program code stored on a non-transitory computer-readable data storage medium and executed by a processor of a respective device.

The user device 204 establishes a communicative connection 206 with the printing device 202 as before (402). Also as before, the printing device 202 transmits its PID 208 over the connection 206 to the user device 204 (404), which thus receives the PID 208 (406). The user device 204 transmits a request for settings for the printing device 202 over the network 106 to the server device 104 (408), which receives the request (410), identifies compatible sets 212 of settings for the printing device 202 based on the PID 208 (412), and transmits identification of these settings sets 212 over the network 106 to the user device 204 (414), which receives this identification (416), as in the example of FIG. 4A. The user device 204 similarly selects a set 212 of settings from the identified settings sets 212 in accordance with which the printing device 202 is to be reconfigured (418).

However, in the example of FIG. 4B, the user device 204 transmits a request over the network 106 to the server device 104 to transmit the selected settings set 212 to the user device 204 for reconfiguration of the printing device 202 (452), and not to the printing device 202 directly as in the example of FIG. 4A. The server device 104 thus responsively receives the request from the user device 204 over the network 106 (454). The server device 104 transmits the selected set 212 of settings over the network 106 to the user device 204 (456), which responsively receives the selected set 212 over the network 106 from the server device 104 (458).

The server device 104 in turn itself transmits the selected set 212 of settings to the printing device 202 (460). For example, the server device 104 may transmit the selected settings set 212 to the printing device 202 over the communicative connection 206 previously established in part 402. The printing device 202 thus receives the selected set 212 of settings from the server device 104 (462), and is then reconfigured (i.e., the device 202 reconfigures itself) according to the received settings (464), as in part 318 of the method 300.

The method 450, unlike the method 300 and the method 400, thus does not assume that the printing device 202 has to have network connectivity to the network 106. This is because the printing device 202 does not have to communicate with the server device 104 in the method 450. Rather, the printing device 202 receives the selected set 212 of settings for reconfiguration from the user device 204. In this respect, the settings themselves may include network settings for the printing device 202 to use to connect to the network 106, which means that network connectivity to the network 106 does not have to be manually or automatically established, such as via transfer of wireless network credentials over the communicative connection 206 between the printing device 202 and the user device 204.

FIG. 5 shows an example method 500 that can be performed by the server device 104. The method 500 can be implemented as a non-transitory computer-readable data storage medium storing program code executable by a processor of the device 102. The method 500 includes receiving, from the printing device 202 over the network 106, the settings for the printing device 202 in accordance with which the device 202 has been configured (502). The method 500 includes responsively saving the settings for the printing device 202 (504).

The method 500 includes subsequently receiving, over the network 106 from either the printing device 202 or the user device 104, a request for settings for the printing device 202, which has an identifier such as the PID 208 (506). The method 500 includes determining whether the settings for the printing device were previously received from the printing device 202 and responsively saved, based on the identifier of the printing device 202 (508). The method 500 includes, in response to determining that the settings for the printing device 202 were previously received from the printing device 202 and responsively saved, transmitting, over the network 106 either to the printing device 202 or the user device 104, the settings reconfigure the printing device 202 (510).

Figure 6:
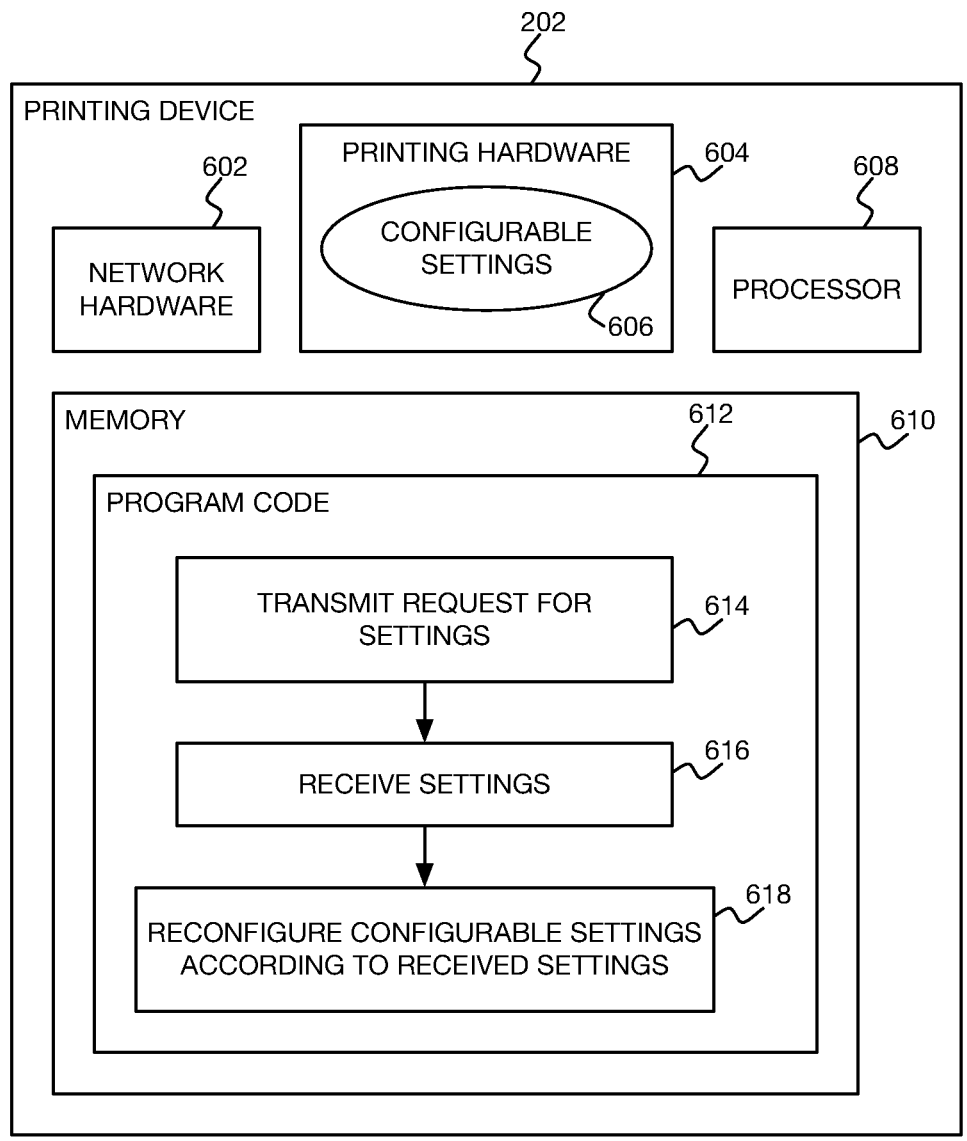
FIG. 6 is a diagram of an example printing device.

FIG. 6 shows the example printing device 202. The printing device 202 includes network hardware 602, such as a discrete network adapter card or a network adapter integrated within a chipset of the device 102, to communicatively connect the printing device 102 to the server device 104 over the network. The printing device 202 includes printing hardware 604 to output print material according to received print jobs. The printing hardware 604 may be or include mechanical and electrical components and circuitry by which print material is output, such as onto print media like paper, to form images, for instance. The printing hardware 604 may include laser-printing hardware, inkjet-printing hardware, or another type of printing hardware. The printing hardware 604 has configurable settings 606 that govern how the printing hardware 604 completes the received print jobs, including how the printing hardware 604 outputs the print material according to the received print jobs.

The printing device includes a processor 608 and a memory 610 storing program code 612 executable by the processor 608 to perform processing. The processing includes transmitting a request to the server device 104 over the network 106 for settings for the printing device 202 previously saved by the server device 104 (614). The processing includes responsively receiving from the server device 104 over the network 106 the settings previously saved by the server device 104 (616). These settings may be the settings described in relation to part 306, 316, or 320 of the method 300, for instance. The processing includes reconfiguring the configurable settings 606 in accordance with the received settings (618).

Figure 7:
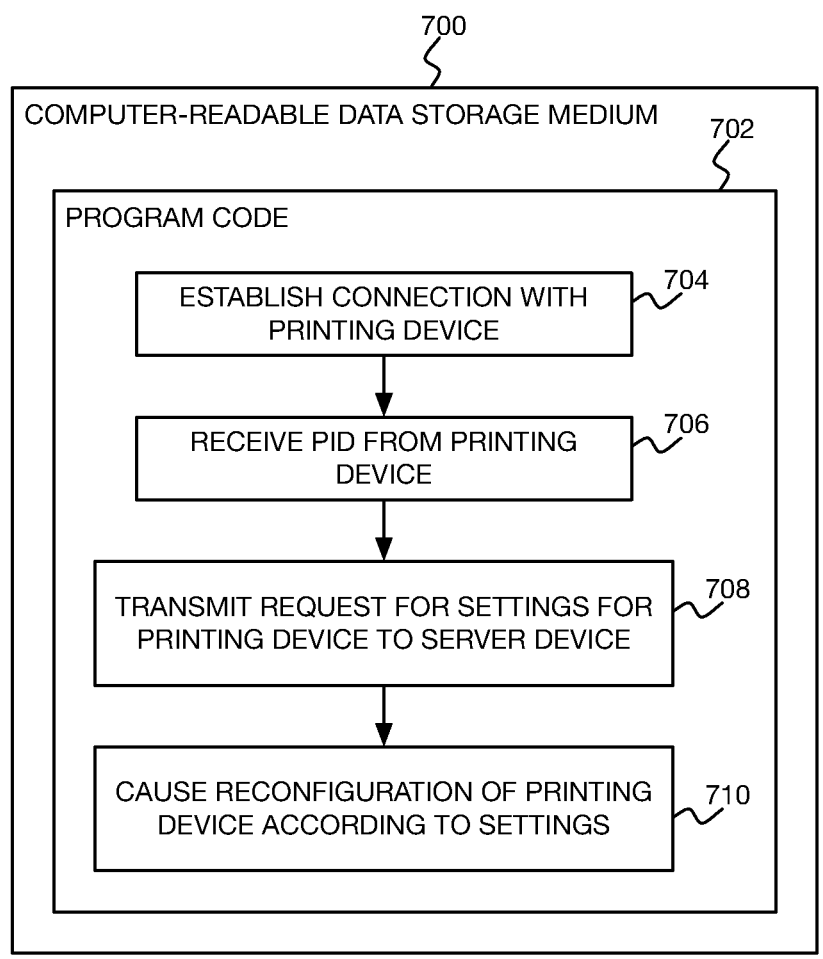
FIG. 7 is a diagram of an example non-transitory computer-readable data storage medium.

FIG. 7 shows an example non-transitory computer-readable data storage medium 700 storing program code 702 executable by the user device 204 to perform processing. The processing includes establishing a communicative connection 206 with a printing device 202 (704). The processing includes receiving an identifier, such as the PID 208, of the printing device 202 from the printing device 202 over the communicative connection 206 (706).

The processing includes transmitting a request to the server device 104 over the network 106 for settings for the printing device 202 previously saved by the server device 104 and associated with a user account 210 at the server device 104 with which the user device 204 is associated (708). The request includes the identifier of the printing device 202.

The processing includes responsively causing reconfiguration of the printing device 202 according to the settings (710). For example, the user device 204 may receive the settings from the server device 104 over the network 106, and transmit the received settings to the printing device 202 over the communicative connection 206, per FIG. 4B. As another example, the user device 204 may instead transmit a request to the server device 104 over the network 106 to transmit the settings for the printing device 202 over the network 106 to the printing device 202 directly, per FIG. 4A.

Techniques have been described for saving settings for a printing device at a server device that may provide a cloud service to the printing device. The printing device may automatically transmit the settings to the server device for saving. Thereafter, the same or different printing device can be reconfigured using these previously saved settings. A printing device may request the settings, or a user device may request the settings on behalf of the printing device. The settings may be transmitted directly to the printing device, or to the user device to transmit to the printing device. A user therefore does not have to manually and painstakingly reconfigure the settings him or herself.

We claim:

1. A method comprising:
receiving, by a server device over a network, a request for settings for a printing device having an identifier;
determining, by the server device, whether the settings for the printing device were previously received from the printing device and responsively saved by the server device, based on the identifier of the printing device;
in response to determining that the settings for the printing device were previously received from the printing device and responsively saved by the server device, transmitting, by the server device over the network, the settings for the printing device to reconfigure the printing device according to the settings; and
in response to determining that the settings for the printing device were not previously received from the printing device and responsively saved by the server device, transmitting, by the server device over the network, settings for a different printing device to reconfigure the printing device according to the settings.

2. The method of claim 1, further comprising, in response to determining that the settings for the printing device were not previously received from the printing device and responsively saved by the server device:
determining, by the server device, a type of the printing device, based on the identifier of the printing device; and
determining, by the server device, whether settings for a first different printing device of the type of the printing device and having a different identifier were previously received from the different printing device and responsively saved by the server device,
wherein the settings for the different printing device that are transmitted to reconfigure the printing device are the settings for the first different printing device in response to determining that the settings for the first different printing device were previously received from the different printing device and responsively saved by the server device.

3. The method of claim 2, wherein the method further comprising, in response to determining that the settings for the first different printing device were not previously received from the first different printing device and responsively saved by the server device:
determining, by the server device, whether settings for a second different printing device of a different type then the printing device and having a second different identifier were previously received from the second different printing device and responsively saved by the server device, wherein the printing device is compatible with the settings for the second different printing device even though the second different printing device is of the different type than the printing device,
wherein the settings for the different printing device that are transmitted to reconfigure the printing device are the settings for the second different printing device in response to determining that the settings for the second different printing device were previously received from the different printing device and responsively saved by the server device.

4. The method of claim 3, wherein the printing device is partially compatible with the settings for the second different printing device,
wherein the printing device includes settings other than the settings for the second different printing device, and/or settings for the second different printing device include settings that are no longer valid,
and wherein a user is requested to provide the settings other than the settings for the second different printing device and/or the settings that are no longer valid.

5. The method of claim 1, further comprising:
previously receiving, by the server device from the printing device over the network, the settings for the printing device in accordance with which the printing device has been configured; and
responsively saving, by the server device, the settings for the printing device.

6. A printing device comprising:
network hardware to communicatively connect the printing device to a server device over a network;
printing hardware to output print material according to received print jobs, the printing hardware having a plurality of configurable settings that govern how the printing hardware completes the received print jobs, including how the printing hardware outputs the print material according to the received print jobs;
a processor; and a memory storing program code executable by the processor to:
> transmit a request to the server device over the network for settings for the printing device previously saved by the server device;
> responsively receive from the server device over the network the settings for the printing device previously saved by the server device; and
> reconfigure the plurality of configurable settings in accordance with the received settings,
> wherein either:
>> the settings were previously transmitted by the printing device to the server device for saving by the server device; or
>> the settings were previously transmitted by a different printing device to the server device for saving by the server device.

7. The printing device of claim 6, wherein the settings were previously transmitted by the printing device to the server device for saving by the server device, and the request is transmitted at reset of the printing device that reverts the plurality of configurable settings from the settings previously saved by the server device to default settings.

8. The printing device of claim 6, wherein the settings were previously transmitted by the different printing device to the server device for saving by the server device, the different printing device is of a same type as the printing device, and the request for the settings is transmitted at initial setup of the printing device, the printing device replacing the different printing device.

9. The printing device of claim 8, wherein the printing device and the different printing device are both associated with a same user account at the server device.

10. The printing device of claim 6, wherein the settings were previously transmitted by the different printing device to the server device for saving by the server device, the different printing device is of a different type than the printing device but having reconfigurable settings with which the printing device is at least partially compatible, and the request is transmitted at initial setup of the printing device.

11. The printing device of claim 10, wherein the printing device and the different printing device are both associated with a same user account at the server device.

12. A non-transitory computer-readable data storage medium storing program code executable by a user device to perform processing comprising:

establishing a communicative connection with a printing device;
receiving an identifier of the printing device from the printing device over the communicative connection;
transmitting to a server device over a network the identifier of the printing device;
receiving from the server device over the network identification of one or multiple sets of settings for the printing device previously saved by the server device and associated with a user account at the server device;
selecting a set of settings from the received sets of settings for the printing device;
transmitting a request to the server device over the network for the selected set of settings;
responsively causing reconfiguration of the printing device according to the selected set of settings.

13. The non-transitory computer-readable data storage medium of claim 12, wherein causing the reconfiguration of the printing device according to the selected set of settings comprises either of:
> receiving the selected set of settings for the printing device from the server device over the network, and transmitting the received selected set of settings to the printing device over the communicative connection; or
> transmitting a request to the server device over the network to transmit the selected set of settings for the printing device over the network to the printing device.

14. The non-transitory computer-readable data storage medium of claim 12, wherein the sets of settings for the printing device previously saved by the server device comprises one or multiple of:
> a set of settings for the printing device previously transmitted by the printing device to the server device and responsively saved by the server device;
> a set of settings for a first different printing device previously transmitted by the first different printing device and responsively saved by the server device, the first different printing device of a same type as the printing device;
> a set of settings for a second different printing device previously transmitted by the second different printing device, responsively saved by the server device, and with which the printing device is at least partially compatible, the second different printing device of a different type than the printing device.

\* \* \* \* \*